United States Patent [19]
Kindell

[11] 4,250,548
[45] Feb. 10, 1981

[54] COMPUTER APPARATUS

[75] Inventor: Jerry L. Kindell, Glendale, Ariz.

[73] Assignee: Honeywell Information Systems Inc., Phoenix, Ariz.

[21] Appl. No.: 407

[22] Filed: Jan. 2, 1979

[51] Int. Cl.³ .............................. G06F 5/00; G06F 3/00
[52] U.S. Cl. ............................. 364/200; 340/347 DD
[58] Field of Search ... 364/200 MS File, 900 MS File, 364/749; 340/347 DD

[56] References Cited

U.S. PATENT DOCUMENTS

| | | | |
|---|---|---|---|
| 3,573,744 | 4/1971 | Rigazio | 364/200 |
| 3,638,195 | 1/1972 | Brendar | 364/200 |
| 3,717,851 | 2/1973 | Cocke et al. | 364/200 |
| 3,916,389 | 10/1975 | Winandy et al. | 364/900 |
| 3,930,232 | 12/1975 | Wallach et al. | 340/347 DD X |
| 3,969,704 | 7/1976 | Liebel | 364/900 |
| 4,044,347 | 8/1977 | Van Voorhis | 340/347 DD |
| 4,057,847 | 11/1977 | Lowell et al. | 364/200 |
| 4,087,853 | 5/1978 | Kashio | 364/900 |
| 4,099,257 | 7/1978 | Arnold et al. | 364/900 |
| 4,141,005 | 2/1979 | Bonner et al. | 340/347 DD |

*Primary Examiner*—Mark E. Nusbaum
*Attorney, Agent, or Firm*—Edward W. Hughes; Wm. W. Holloway, Jr.; Ronald T. Reiling

[57] ABSTRACT

Computer apparatus in a word organized computer system for implementing a single computer instruction for moving a binary number stored in one of a plurality of addressable registers to a designated memory location in a word addressable memory. The binary number is divisible into a maximum of four characters with characters of a given number having either 8 or 9 bits, and a word has 36 bits divisible into four bytes. If the characters have 8 bits, the characters are reformatted so that there is one character per byte. If the characters have 9 bits, they are not reformatted since there is already only one character per byte. The bytes are then shifted so that the byte position containing the most significant character of the binary number occupies a designated byte position in a first word stored in a data out register ready to be read into memory for storage at the designated memory location. After the first word is stored in memory, and if the bytes containing characters of the binary number overflow a word boundary of the first word, bytes containing overflow characters are stored in a second word in the data out register ready for storage at a memory location contiguous to the designated memory location.

21 Claims, 8 Drawing Figures

COMPUTER APPARATUS

BACKGROUND OF THE INVENTION

1. Field of the Invention

This invention is in the field of digital data processing systems and more particularly relates to apparatus in a data processing system for implementing an instruction to move a binary number stored in an addressable register to the memory for storage beginning at a designated memory location. The form, or format, or the binary number may be incompatible with the system's capability for retrieving the number from the word addressable memory of the system. In implementing the instruction, the apparatus places the binary number in a format compatible with its being stored so that it can be subsequently retrieved.

2. Description of the Prior Art

Digital data processing systems are optimized to handle a given number of bits in parallel, or as an entity, with such an entity being defined as a word, or a machine word. A word in turn can be defined as including a plurality of bytes with each byte containing a given number of bits. There is no agreed to standard for the number of bits to a byte. Some computer equipment manufacturers have standardized their equipment to use an 8 bit byte while others use a 9 bit byte. In this application the word byte when used without a prefix, or modifier, will mean a 9 bit byte.

Some data processing systems organize their memories, or working store, on the basis that each addressable memory location stores a byte, most commonly an 8 bit byte. Others are organized so that each addressable memory location will store a machine word. Either type of computing system when required to operate on, or process, binary numbers will generally restrict or limit the binary numbers to a given number of characters where a character in an 8 bit byte machine will have 8 bits, an octet; and in a 9 bit byte machine will have 9 bits, a nonet. A word oriented data processing system in which the present invention could be used has a word addressable memory in which a word has 36 bits which are divisible into 4 bytes. To increase the ability of such a word oriented system to compete with 8 bit byte oriented computers, it is desirable that the word oriented computer be able to run application programs written for an 8 bit byte character addressable memory computer system with the minimum of change to the programs and the computer. Such a word oriented computer should be able to handle, which includes reading into memory and writing from memory, binary numbers of from 1 to 4 characters, either octets or nonets efficiently. An advantage derived by a computer having this capability is that it avoids the necessity of users replacing a byte oriented computer from having to rewrite their application programs to run on a word oriented computer. Such a conversion can be both expensive and time consuming. However, to provide a word oriented computer having the characteristics set forth above with the capability of handling binary numbers having a limited number of characters of either 8 or 9 bits per character requires that the computer have the ability to store a binary number in a memory location with the most significant character of the binary number, the one that contains the most significant bit of the binary number, being stored in any one of 4 byte locations of a word at an address designated in the instruction. Any characters of the binary number which overflow a word boundary are stored in an adjacent, or contiguous, memory address. Whether an overflow will occur depends upon the number of characters in a given binary number and the byte location in the first word containing the most significant character in the binary number. The second word, if needed, will have placed in it bytes containing characters of the binary number which bytes are positioned so that they are left justified against a word boundary. The bytes containing characters are positioned in order of decreasing significance from left to right. Where 8 bit characters are to be stored in a 9 bit byte location or position, the most significant bit position of each byte will have a fill bit, normally a logical zero, stored in it.

Given a binary number of from 1 to 4 characters with each character of the given binary number having either 8 or 9 bits per character which are stored in a designated one of a group of addressable registers with the characters of the binary number being right justified against a word or half word boundary; the problem is how to efficiently store the characters of the binary number in a word addressable memory so that they can be efficiently retrieved from a word addressable memory. To do so requires that there be only one character per byte position and that the location of the bytes containing the characters is easily and accurately determinable. One way of accomplishing this is by placing the most significant character of the binary number in a designated one of the four byte positions of the word to be stored at a given memory location with the other bytes containing characters being placed in order. More particularly the problem is how to efficiently move a binary number as it exists in a designated addressable register to a data out register with the byte containing the most significant character of the binary number positioned in a first word in the data out register so that the byte containing the most significant character will be positioned in the first word in a byte position determined by the instruction with the other bytes containing characters of the binary number being positioned in the first word in order of decreasing significance. If bytes containing characters of the binary number overflow or cross over a word boundary of the first word then such overflow bytes are left justified and stored in order in a second word to be stored in the data out register after the first word has been transmitted to memory for storage in the designated memory location.

Heretofore the manner in which this particular function has been performed has been by software programs. Such programs, however, require a significant number of instructions, each of which instructions may require several clock periods so that a significant amount of time, comparatively speaking, is required to execute such a program. The penalty in performance, measured in terms of throughput of a data processing system which must make such transformations, obviously, adversely affect the ability of such data processing system to compete effectively with data processing system organized to directly address the characters of the binary number in memory, particularly in performing programs which require operating on a large number of pure binary numbers divisible into 8 bit characters.

SUMMARY OF THE INVENTION

The present invention provides apparatus for implementing a single instruction for moving a binary number of from 1 to 4 characters where a character can consist of either 8 or 9 bits from one of a plurality of a full word, or half word, registers with a word being defined as having 36 bits divisible into 4 byte positions, or bytes. The binary number is stored in a designated one of the addressable registers with the binary number being right justified to a word boundary; i.e., with the least significant bit of the number being placed in the least significant bit position of the register. The more significant bits of the number are stored in bit positions of the register in order of increasing significance from right to left.

In response to the receipt of a move to memory (MTM) instruction the control logic circuit means, or controller, of the central processing unit (CPU) of the data processing system applies control signals to the addressed register in which the binary number is stored to cause the bits of that binary number to be applied to a format switch whose condition will be selected, or enabled, by a control signal from the controller so that the characters of the binary number will be unpacked if they are octets. One octet will be placed in each byte with the bits of each octet occupying the lower order bit positions of each such byte. The format switch output word is stored into an intermediate register. The word stored in the intermediate register in response to signals from the controller is applied to a shifter. Control signals from the controller cause the shifter and associated circuits to shift, or rotate, the bits applied to it and to form a first output word in which the byte containing the most significant character of the binary number is positioned in a predetermined byte position of the first word; which first word is applied to and stored in a data out register. Bytes containing characters of the binary number other than the most significant, if any, are positioned in the first word in order of decreasing significance from left to right. If the number of bytes containing characters of the binary number exceeds the byte positions available in the first word, then after the first word is transmitted to memory from the data out register, control signals from the controller cause the shifter and associated circuits to produce a second word in which the overflow bytes are left justified and placed in order of decreasing significance. The second word is stored in the data out register so that it is ready to be read into memory.

It is therefore an object of this invention to provide apparatus for implementing a single instruction for moving a binary number divisible into characters stored in an addressable register and placing the characters of the number in not more than two words in a data out register prepatory to reading the words into memory with the byte containing the significant character of the number positioned in a byte position designated by the instruction.

It is another object of this invention to provide in a synchronous digital data processing system an instruction that replaces a software program for quickly and reliably moving a binary number stored in an addressable register to a data out word register ready to be stored into a memory location designated by the instruction.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which.

DETAILED DESCRIPTION OF THE INVENTION

Figure 1:
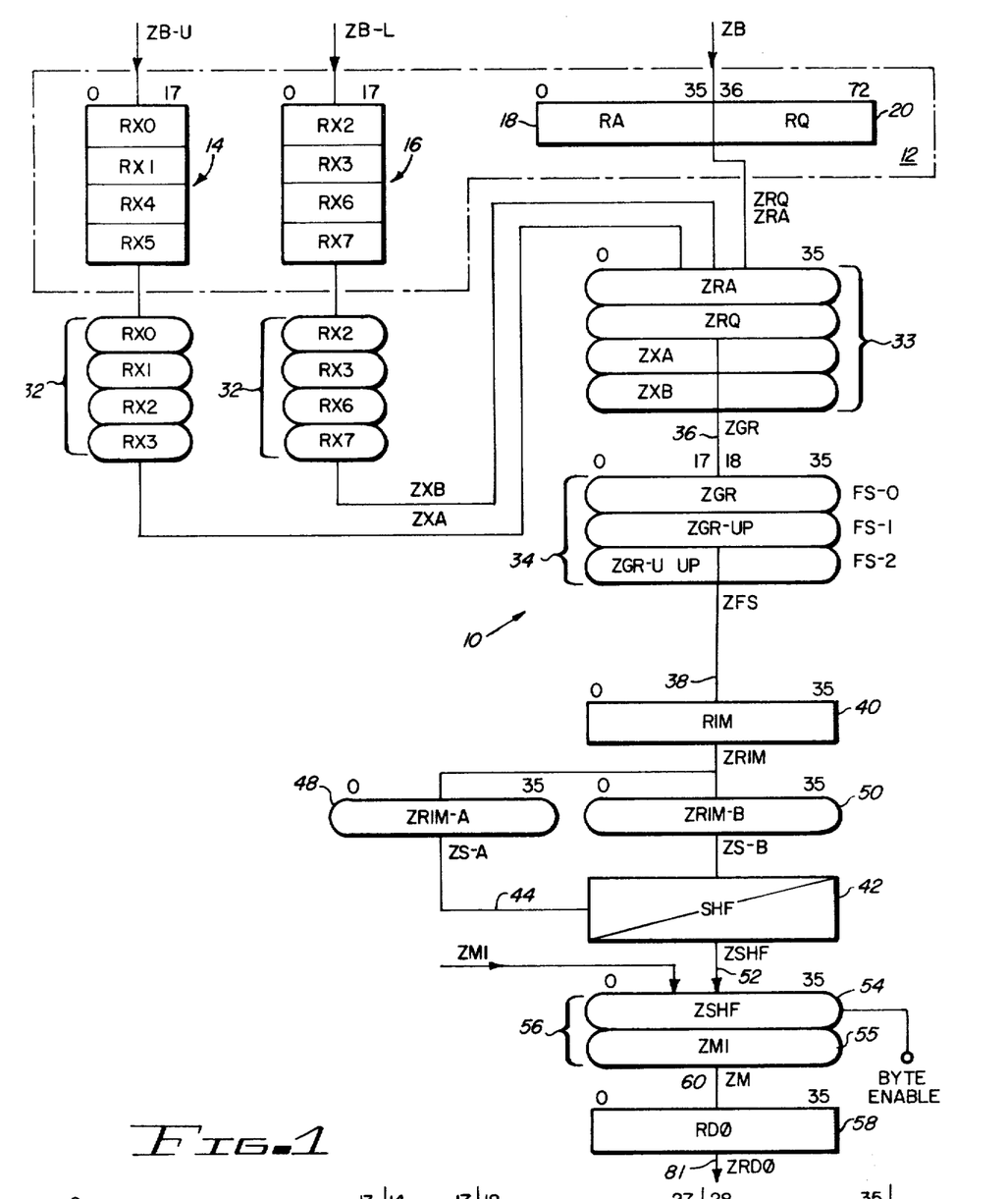
FIG. 1 is a schematic block diagram of a portion of a central processor of a data processing system illustrating the invention.

In FIG. 1, only those elements of central processing unit (CPU) 10 that are utilized in the execution of the move to memory (MTM) instruction are illustrated. CPU 10 is a subsystem of a data processing system such as that illustrated in U.S. Pat. No. 4,000,487 which issued on Dec. 28, 1976. The move to memory instruction will be implemented, or executed, after a pure binary number has been stored into one of the group of addressable registers 12 which group includes two banks 14, 16 of half word registers and two full word registers RA 18 and RQ 20. The binary number stored in one of the addressable registers 12 will normally have been produced by an arithmetic unit of CPU 10 which is not illustrated, after operating on, or manipulating, binary numbers to produce a result, a binary number, which is stored in one of the addressable registers 12 prior to its being written into, or stored in, memory. The first bank of half word registers 14 includes registers RX 0, 1, 4 and 5, and the second bank 16 includes registers RX 2, 3, 6 and 7. Registers RX 0-7 are half word registers, i.e., they are capable of storing 18 bits so that only binary numbers having one or two characters can be stored in them.

Figure 2:
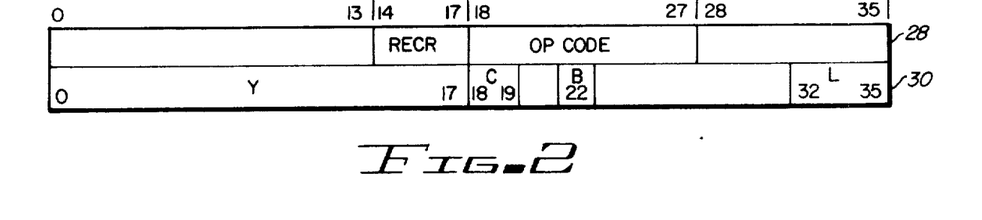
FIG. 2 illustrates the format of an instruction.
Figure 3:
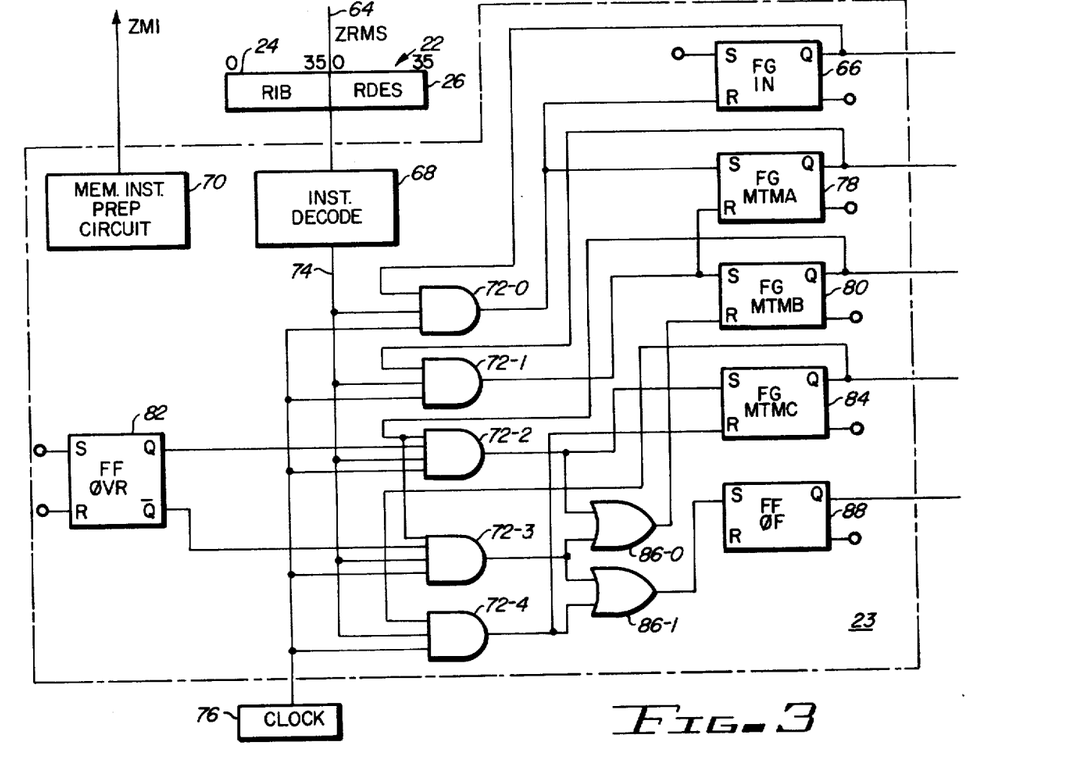
FIG. 3 is a schematic block diagram of a portion of the control logic circuit.

The characters of a binary number stored in any one of the addressable registers 12 will be right justified against a half word or full word boundary, i.e., with the least significant bit of the binary number occupying the least significant bit position of the register. Registers RA 18 and RQ 20 are full word registers, that is they have 36 bit positions, so that a binary number having up to four characters of either 8 or 9 bits can be stored in either of registers RA or RQ with the characters of the binary number being right justified against, in this case, a full word boundary which is between bit position 35 and 36 of registers 18, 20. To move a binary number from one of the addressable registers 12, the move to memory instruction, the format of which is illustrated in FIG. 2 will have been read out of memory and stored in the double word instruction register 22 of control logic circuit or controller 23 of CPU 10 which is illustrated in FIG. 3. Register 22 is divided into an instruction register RIB 24 and descriptor register RDES 26.

The RECR field, bit positions 14-17 of instruction 28 identifies the register of the group of registers 12 in which the binary number to be moved to memory is located. The operation code field, bit positions 18-27, identifies the instruction as being the move to memory instruction. The Y field, bit positions 0-17, of descriptor 30 is the address in the memory subsystem of the data processing system of the word location into which a first word containing the most significant character of the binary number is to be written. The C field, bit positions 18-19, of descriptor 30 identifies the byte position in the word to be stored into memory into which the most significant character of the binary number is to be placed, and the B field, bit position 22, identifies the type of character, i.e., whether it's an octet or a nonet. The L field, bit positions 32-35, of descriptor 30 identifies, or contains, the number of characters in the binary number stored in the addressable register identified in field RECR.

After receipt of the MTM instruction which includes an instruction word 28 and a descriptor 30, the control circuit 23, a portion of which is illustrated in FIG. 3, will produce the necessary control signals to implement the instruction. The addressable register identified in field RECR will be enabled as well as the appropriate positions of the selector switch 31 or 32 if one of the registers RX 0-7 is designated in field RECR and the signals stored in that register will be applied to one of the input buses to the bank of selector switches 33 which selects the signals that will be applied to bus ZGR 36 and through it to format switch 34. Depending upon the character type of the binary number, i.e., whether they are octets or nonets and the addressable register in which the binary is stored one of the switch positions, FS 0-2, will be enabled, or selected by signals from controller 23 so that the characters of the binary number will be positioned or reformatted, if necessary, so that in the word on format output bus ZFS 38 there is only one character per byte and so that bytes of the word containing characters of the binary number are right justified, i.e., the byte containing the least significant character will be right justified against a half word or full word boundary. If the characters are nonets then irrespective of the addresseable register in which the binary number was stored, the initial position FS-0 will be enabled which will pass the signals on bus ZGR 36 through format switch 34 unchanged to format switch output bus ZFS 38.

If the characters of the binary numbers are octets, and if the designated addressable register is a full word register RA, or RQ, then position FS-1 will be enabled which unpacks the character of the binary number so that only one octet is present in a byte position on format switch output bus 38 with the bytes containing characters of the binary number being right justified against a full word boundary. The octet in each byte location is also right justified within its byte and the most significant bit position of each byte containing an octet will have a fill bit, normally a logical zero, placed in it.

If the characters of the binary numbers are octets, and if the designated addressable register in which the binary number is stored is one of the half word register RX 0-7, position FS-2 of format switch 34 will be enabled, which unpacks the octets of the binary number applied to format switch 34 so that only one octet is positioned or present in a byte position on format switch output bus 38 with the bytes containing characters of the binary number being right justified against a half word boundary. The octets in each byte location on bus ZFS 38 are also right justified within its byte, and the most significant bit position of each byte will have a fill bit stored in it. The bits of the format switch output word on output bus ZFS 38 will be applied to and stored into intermediate register RIM 40. The format switch output word stored into intermediate register 40 will contain from 1 to 4 characters, with one character per byte and with the byte containing the least significant character of the binary number being right justified against a full word or half word boundary.

Controller 23 will then cause the word stored in intermediate register 40 to be applied to shifter 42 over bus ZS-A 44 and bus ZS-B 46 by enabling switch ZRIM-A 48 and switch ZRIM-B 50. Controller 23 will, since the number of characters in the binary number is specified in field L of descriptor 30, the register from which the binary number was obtained is specified in field RECR of instruction 28, and the byte position in the first word to be stored into memory into which the byte containing the most significant character of the binary number is to be positioned or stored is specified in field C of descriptor 30, apply control signals to shifter 42 to cause shifter 42 to rotate the words applied to it over buses ZS-A and ZS-B to place the byte containing the most significant character of the binary number in the desired byte position in the word on shifter output bus ZSHF 52. Switch position ZSHF 54 of selector switch 56 in response to control signals from controller 23 selects the bytes on bus ZSHF to be applied to and stored in data out register RDφ 58. Only those byte positions of switch position 54 will be enabled which permit the byte containing the most significant character of the binary number and any other bytes containing characters of the binary number in lower order byte positions within the word boundaries of bus ZM 60 to be applied to and stored into data out register 58. Byte positions of greater significance than the one into which the byte containing the most significant character of the binary number is stored will be filled with fill bits, or logicals 0s.

If the bytes containing the less significant characters of the binary number cross or overflow a word boundary, on bus ZM 60, for example, then in order for the remaining bytes containing such less significant characters of the binary number to be stored in memory, the contents of the intermediate register 40 will be applied to the shifter 42, a second time and shifted as related above so that the byte containing the most significant character will be in the byte position designated by field C of descriptor 30. In this instance, the control signals applied to switch position ZSHF 54 will enable the byte positions of switch ZSHF-54 so that such overflow bytes, left justified against the left word boundary of bus ZM-60 and placed in order of decreasing significance will be applied by bus ZM-60 to data out register 58. As a result, a second word containing the overflow characters is stored in register 58 ready for storage in an adjacent or contiguous memory location; namely the memory location having an address of Y+1, for example.

Obviously the first data out word stored into register 58 which contains the most significant character of the binary number will be the first word read out of register RDɸ for storage in memory as the result of a memory write instruction having been issued to memory through register RDɸ by control circuit 23. Such a write instruction causes the next word stored in register 58 to be stored in memory at memory location Y. After the first data word containing a character of the binary number is transferred to memory from register 58 and if an overflow condition exists, then the second data word stored in register 58 containing the lower order, or less significant, characters of the binary number will be issued to memory for storage at location Y+1, in response to the issuance of second write instruction. In this manner the bytes of the words stored in memory containing characters of the binary number will be arranged in order of decreasing significance from left to right with respect to the byte containing the most significant character of the number.

FIG. 3 is a schematic block diagram of a portion of a conventional control circuit 23 of CPU 10. After an instruction 28 and descriptor 30 have been received from memory over memory service bus ZRMS 64 the presence of these signals, or bits, in registers 24, 26 is sensed by conventional circuits which are not illustrated and cause flip flop FGIN 66 to be set. When flip flop 66 is set, it will produce signals which cause the conventional components of controller 23 to sense the RECR field, bit positions 14–17, of instruction 28, and the op code field, bit locations 18–27 of instruction 28 will be applied to instruction decode circuit 68. The address field, bit locations 0–17, of the descriptor 30 will be used by the memory instruction preparation circuit 70 to prepare write instructions to memory. The C field, bit positions 18–19, the B field, bit position 22 and the L field, bit positions 32 and 35, will also be sensed so that appropriate control signals for format switch 34, shifter 42, and position 54 of selector switch 56 can be produced when needed.

When flip flop 66 is set, its Q signal which will be a logical 1 will be applied to And circuit 72-0. The instruction decode circuit 68 will energize conductor 74 and clock 76 will periodically produce clock pulses which are, in this example, logical 1s. Thus when the begin flip flop 66 is set and line 74 has a logical 1 signal applied to it to indicate that instruction decode circuit 68 has decoded the op code field of instruction 28 as being the move to memory instruction, the next clock pulse produced by clock 76 will enable And gate 72-0 to apply a logical 1 signal to the set terminal of flip flop FGMTA 78 which sets it. The signal that sets flip-flop 78 will reset FGIN 66. When flip flop FGMTA 78 is set, the binary number in the addressable register designated by field RECR will be applied to the format switch 34 by selecting the appropriate positions of the necessary selector switches illustrated. The position or condition of format switch 34 will be selected which will result in the characters, if octets, of the binary number applied to switch 34 being unpacked with one character per byte and with the bytes right justified against the full word boundary if they came from a full word register such as RA or RQ and against the half word boundary if they came from one of the index registers RX 0-7. The bits of the word on format switch output bus ZFS 38 will be stored into intermediate register 40.

When flip flop FGMTA 78 is set, its Q signal will be applied to one input terminal of And gate 72-1. A second terminal of gate 72-1 is connected to MTM line 74. Thus when the next clock pulse is produced, flip flop FGMTMB 80 will be set and the signal from And gate 72-1 which set FGMTMB is also applied to the reset terminal of flip flop FGMTMB which resets it. When flip-flop 80 is set, the signal stored in register RIM 40 will be applied over shifter input bus ZS-A 44 and shifter input bus ZS-B 56 to shifter 42. Shifter 42 will also be provided with control signals controlling the amount of shift or rotation necessary to place the byte containing the most significant character of the binary number in the byte position in the word on shifter output bus 52 designated by field C. Shifter 42, which is a conventional circuit, in the preferred embodiment, rotates the signals applied to it to the left the designated amount, 1, 2, 3, or 4 byte positions as will be explained below. Switch position 54 of selector switch 56 will be enabled so that only those byte positions of the first shifter output word on bus ZSHF 52 are applied to bus ZM 60 which includes the most significant character of the binary number and any other byte positions containing less significant characters of the binary number in decreasing order of significance within the word boundaries of said shifter output word. The first data out word on bus ZM 60 is stored on data out register RDɸ 58. When the first data out word is stored in register 58, it is ready to be stored, or written, into memory. The memory instruction preparation circuit 70 will have issued a write instruction to the memory preparing the memory system to store the next word on data out bus ZRDɸ the first word containing a character of the binary number at the memory location specified by field Y of descriptor 30.

If the byte position into which the byte containing the most significant character of the binary number is placed plus the number of characters in the binary number exceeds 4, then an overflow condition will exist. An overflow condition means that one or more bytes containing less significant characters of the binary number will have to be placed in a second data out word to be written into memory at a contiguous memory location. If there is an overflow condition, then overflow flip flop FFɸVR 82 will be set. The Q output of FGMTMB will be a logical 1 as will be the Q output of FFɸVR. The move to memory instruction decode line 74 is also a logical 1 so that AND gate 72-2 is enabled. The next clock pulse from clock 76 will be applied to the set terminal of flip flop FGMTC 84 which will set it. The logical 1, or clock pulse, from AND gate 72-2 is applied through Or gate 86-0 to reset flip flop FGMTMB 80. When flip flop FGMTC 84 is set, the contents of register RIM 40 will again be applied to shifter 42 and will be shifted, or rotated, as when flip flop FGMTMB 80 was set. The output word on shifter output bus 52 will also be the same, but in this case position 54 of selector switch 56 will be enabled so that the bytes containing the less significant characters of the binary number which overflowed a word boundary, or are positioned in a higher order byte position than the byte position containing the most significant character are present in the output word applied to bus ZM-60 for storage in RDɸ. As a result only bytes containing overflow characters of the binary number will be positioned in order of decreasing significance from left to right with the byte containing the most significant overflow character being left justified against a word boundary of the second data out word. When FGMTMC is set, the memory instruction preparation circuit 70 will issue a second write to memory instruction having the address of Y plus 1 and will cause the second data out word stored in register RDφ to be read into memory for storage at location (Y+1). Setting FGMTMC enables And gate 72-4 so that the next clock pulse from clock 76 is applied through Or gate 86-1 to set end of instruction flip flop FFφF 88. The signal from gate 72-4 is applied to the reset terminal of FGMTMC to reset it.

If there is no overflow condition, then flip flop 82 will be reset so that the signal at its $\bar{Q}$ output will be a logical one. And gate 72-3 will be enabled by the Q output signal of flip flop 80, the logical 1 signal on conductor 74, and the $\bar{Q}$ signal from FFOVR 82 so that the next clock pulse produced by clock 76 is applied to Or gate 86-1 to set end of instruction flip flop 88. The logical 1 signal produced by And gate 72-3 is applied through Or gate 86-0 to reset flip flop 80. Setting FFφF ends the execution of the MTM instruction in this exmple with only a single data out word being written into memory at location Y.

Figure 4:
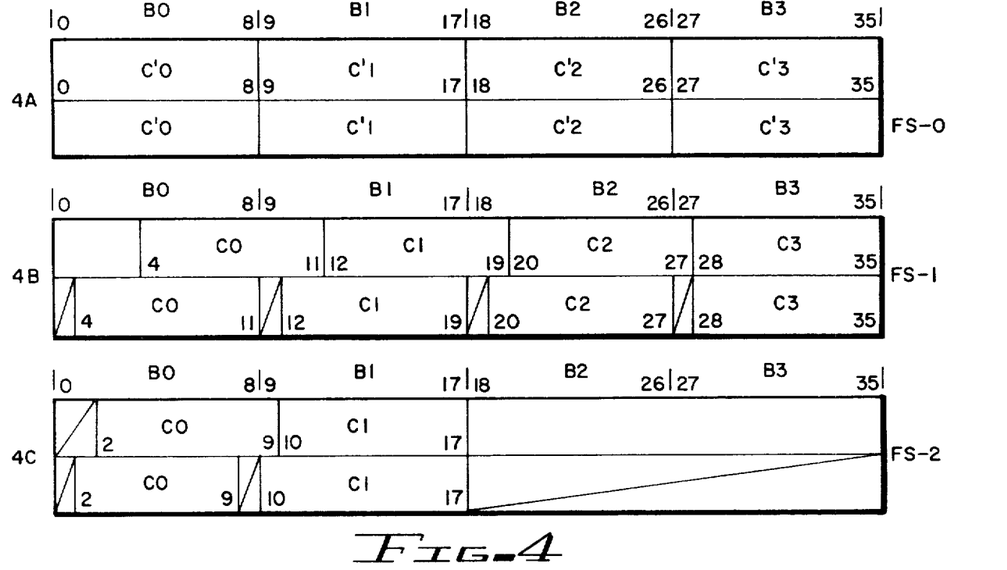
FIG. 4 is comprised of FIGS. 4A through C which illustrate the changes in formats of binary numbers as they move through a format switch.

Referring to FIG. 4, FIGS. 4A, B and C illustrate the relationships between the formats of words or half words applied to format switch 34 and the formats of switch 34's output words as a function of the position FS 0-2 of format switch 34 which is selected or enabled by control signals from controller 23. If the characters of the binary number stored in either the RA, RQ or RX 0-7 are made up of notes, or have 9 bits per character, then the nonets and byte positions coincide as illustrated in FIG. 4A. In FIG. 4, and in other figures, a nonet is designated by C', with the most significant character being C'0. Thus, when switch position FS-0 is enabled, the bits appearing on output bus ZFS 38 will be unchanged.

If the characters of the binary number are octets and if they are stored in the RA or RQ register, they will have the format illustrated in the upper line of FIG. 4B. When this is the case, format switch position FS-1 will be enabled which unpacks the octets C so that there will be one octet per byte position. The byte positions in a word or designated B0, B1, B2, B3. The characters C0, C1, C2, C3 in this case, since they are octets are denoted by the capital letter C. Each of the byte positions B 0-3 of the shifter output word on output bus ZFS 38 will have an octet positioned in it, C3 in B3, C2 in B2, etc. The most significant bit position in each byte position B 0-3 will have a fill bit placed in it, bits 0, 9, 18, 27. Bytes containing the characters C of the binary number will be right justified in this case against a word boundary.

In FIG. 4C if the addressable register is one of the index registers RX 0-7, and if the characters of the binary number stored in one of the index register are octets, then the format of the signals applied to format switch 34 will be as illustrated in the upper line of FIG. 4C. The characters C0, C1 will be unpacked by enabling switch positions FS-2. In this example the most significant bit positions of bytes B0 and B1 of the format switch output word illustrated in the lower line of FIG. 4C will have placed in them fill bits, logical 0s, bits positions 0 and 9.

Figure 5:
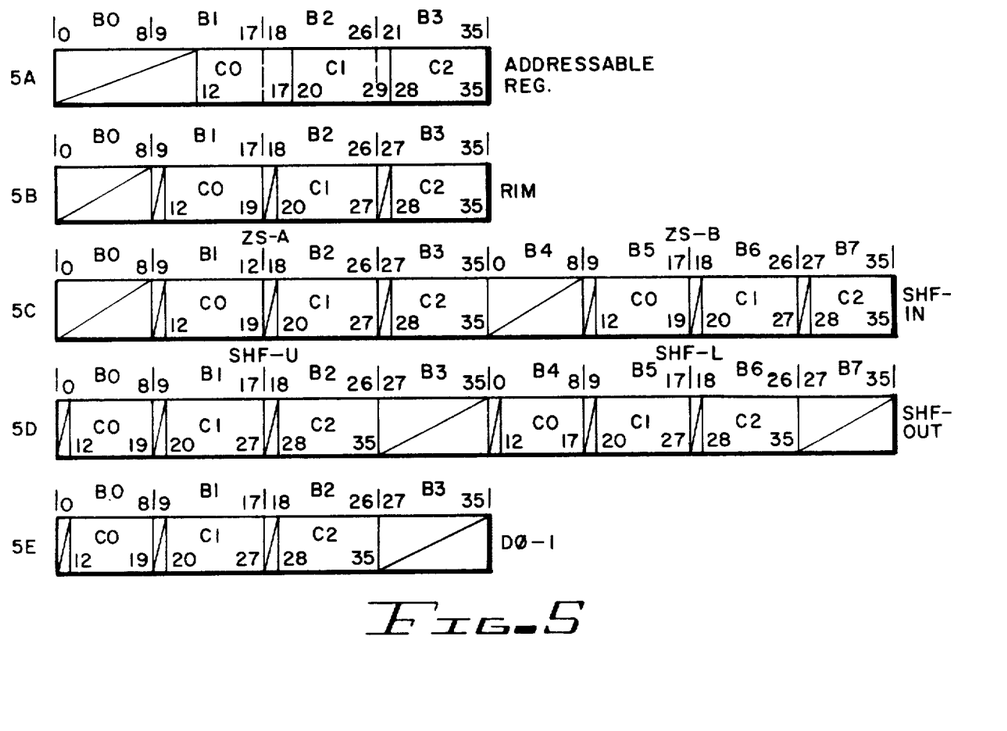
FIG. 5 is comprised of FIGS. 5A through E which illustrate the formats of a binary number as stored in an addressable register, as stored in the intermediate register after being reformatted as applied to a shifter, as it appears on the output bus of the shifter and as it is stored in a data out register ready to be written into memory.

FIG. 5 is illustrative of what happens to the characters of a binary number stored in an addressable register during the implementation, or execution of the MTM instruction. FIG. 5A is an example of a binary number as stored in an addressable register, in this case RA or RQ since there are three octets, C0, C1 and C2 with the octets C 0-2 being positioned in order and right justified against a full word boundary, i.e., with the least significant bit of the binary number being in bit position 35. After going through format switch 34 the characters C 0-2 will be unpacked, i.e., there will be one octet per byte position with octet C0 being in byte position B1, octet C1 in byte position B2, and octet C2 in byte position B3. The most significant bit positions of byte positions B1, B2, B3 will have stored into them a fill bit, or a logical 0. FIG. 5B illustrates the format of the output word produced by format switch 34 on its output bus ZFS-38 which is stored in register RIM 40. In FIG. 5, it is assumed that the most significant octet C0 is to be placed in byte position B0 in the first data out word Dφ-1 illustrated in FIG. 5E with the bytes containing the octets C1 and C2 placed in order of decreasing significance with respect to octet C0. The word in intermediate register RIM 40 will be applied over buses ZS-A and ZS-B so that the formats of the words applied to shifter 42 will be as illustrated in FIG. 5C. Since the binary number has three characters, or octets, and since the most significant octet C0 is to be positioned in byte location B0, shifter 42 will have applied to it signals causing it to shift the words applied to it in this example one byte position to the left as illustrated in FIG. 5D. The output word of shifter 42 is applied to shifter output bus ZSHF. Output bus ZSHF 52 is a one word bus so that only the bits of the upper word SHF-U are applied to the switch position SZHF 54 of selector switch 56. Since there is no overflow, it is not necessary for switch position 54 to select which byte positions will be applied to its output bus ZM 60 for storage in data out register 58. FIG. 5E also illustrates the format of the data out word as stored in data out register 58 ready to be written into memory.

Figure 6:
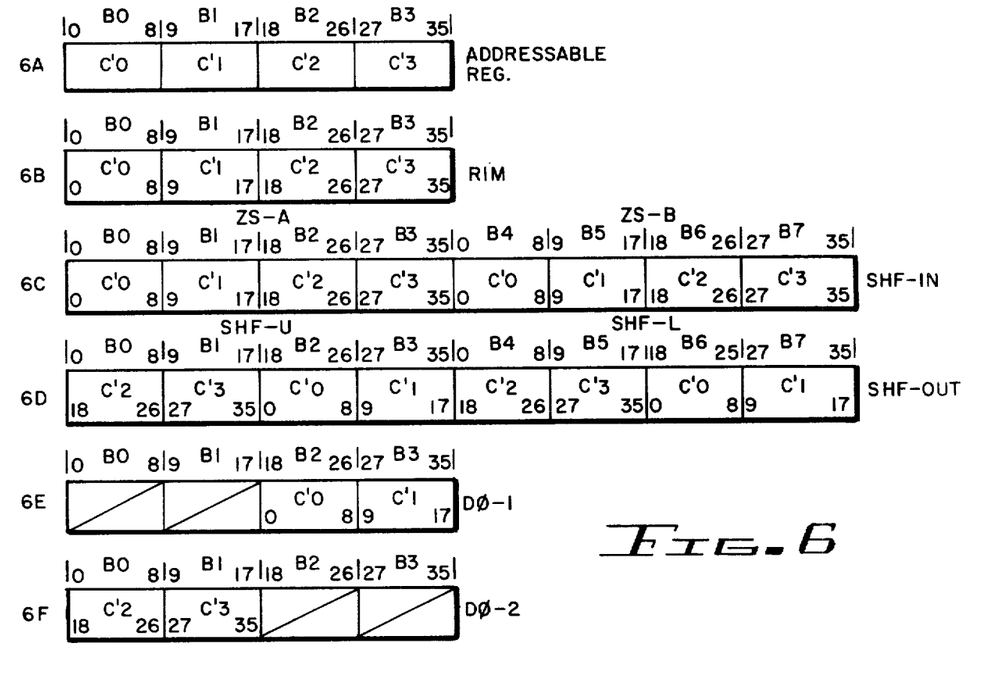
FIG. 6 is comprised of FIGS. 6A-F which are similar to FIGS. 5A-E and illustrate a different possibility of character size and the manner in which the words stored in the intermediate register are shifted or rotated to produce two output words to be applied to the data out register.

FIG. 6 illustrates the changes to the nonets of a binary number stored in an addressable register either the RA or RQ illustrated in FIG. 6A which consists of four nonets C' 0-3. Format switch position FS-0 will be enabled, which applies the signals on bus ZGR to bus ZFS unchanged for storage in the intermediate register 40 as illustrated in FIG. 6B. The format switch output word stored in intermediate register 40 will then be applied to shifter 42 over buses ZS-A and ZS-B so that the words applied to shifter 40 are as illustrated in FIG. 6C. In this example, the most significant character C'0 is to be positioned in the byte position B2 so that the words applied to shifter 42 are shifted or rotated to the left two byte positions, or eighteen bits. Knowing that the byte containing the most significant nonet C'0 is to be placed in byte position B2 and that the binary number has four nonets, in this example, an overflow condition exists since 2+4 is greater than 4 so that overflow flip flop 82 will be set. When the first data out word Dφ-1 is stored into data out register 54, the higher order byte positions B0 and B1 of position ZSHF 54 will not be enabled so that only the characters C'0 and C'1 will be present in byte positions B-2 and B-3 in the word on bus ZM as illustrated in FIG. 6E. On the next clock signal, signals from controller 23 are applied to shifter 42 as well as the contents of intermediate register RIM 42 so that the words applied will be shifted to byte positions illustrated in FIG. 6D, the same as before. Since this is an overflow condition byte positions B2 and B3 of switch ZSHF 54 will not be enabled but byte positions B0 and B1 will be so that the characters C'2 and C'3 will be placed in positions B0 and B1 of the second data out word D$\phi$-2 which will have the format illustrated in FIG. 6F.

Figure 7:
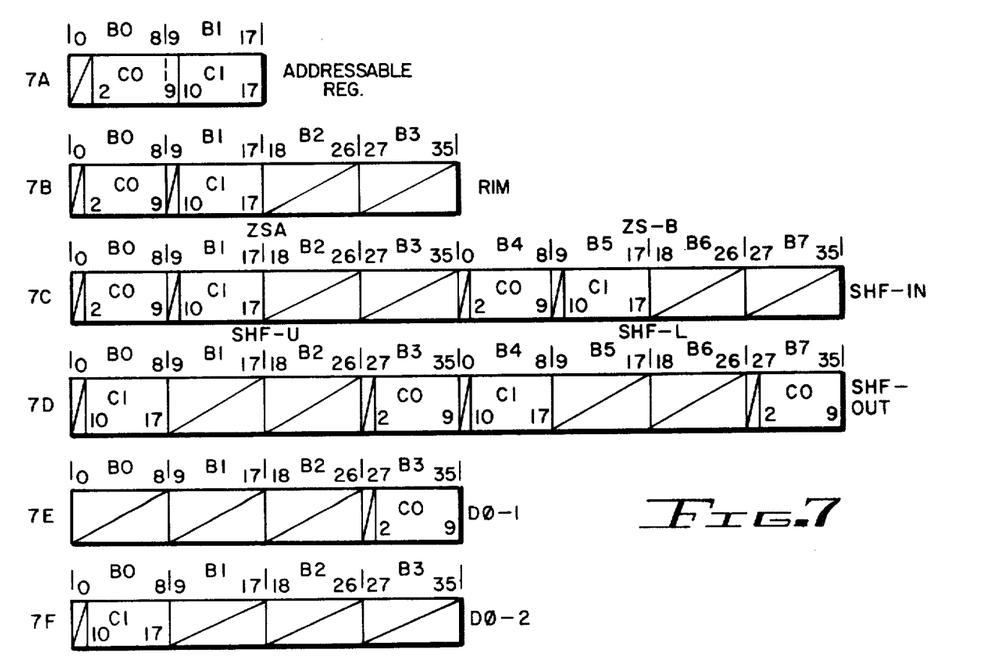
FIG. 7 is comprised of FIGS. 7 A-F which are similar to FIG. 6 and illustrate the formats of a binary number stored in a half word register and in which one of the bytes containing a character overflow a word boundary.

FIG. 7 is an example of the transformation that occurs if a binary number is stored in one of the index registers RX 0-7. When the characters of the binary numbers are applied to format switch 34, and if they are octets, switch position FS-2 will be enabled. This unpacks the characters C0 and C1 so that C1 is positioned in byte B1 and C0 is in byte B0. The least significant character C1 is right justified against the half word boundary between bit position 17 and 18 as seen in FIG. 7B. On the next clock pulse the contents of the intermediate register RIM, as illustrated in FIG. 7B will be applied over buses ZS-A and ZS-B to shifter 42. The formats of the words applied to shifter 42 are illustrated in FIG. 7C. In this example, it is assumed that the byte containing the most significant character C0 is to be placed on the fourth byte position B-3 in the first data word D$\phi$-1. To accomplish this the words applied to shifter 42 are shifted one byte position to the left. The formats of these words after being rotated one byte position to the left are illustrated in FIG. 7D. Since this is an overflow condition, i.e., there are two characters to the number and the most significant character is to be placed in the fourth byte position, switch position ZSHF 54 will enable only byte position B-3 to be applied to its output bus ZM 60 for storage in data out register 58. Fill bits or logical zeroes will be used to fill the other more significant byte positions B-0, B-1, B-2 on bus ZM as seen in FIG. 7E. Whenever there is an overflow condition, all byte positions to the left of the byte positions into which the byte containing the most significant character is located will be filled with fill bits in a preferred embodiment. On the second trip through shifter 42, since flip flop FGMTC 84 is enabled, the signals applied to the shifter 42 and the amount of shift, or rotation remains the same; but, in this example, the second data out word D$\phi$-2 has the octet C1 in byte position B0. The format of the second data out word D$\phi$-2 as applied to and stored in data out register 40 is as illustrated in FIG. 7F.

Figure 8:
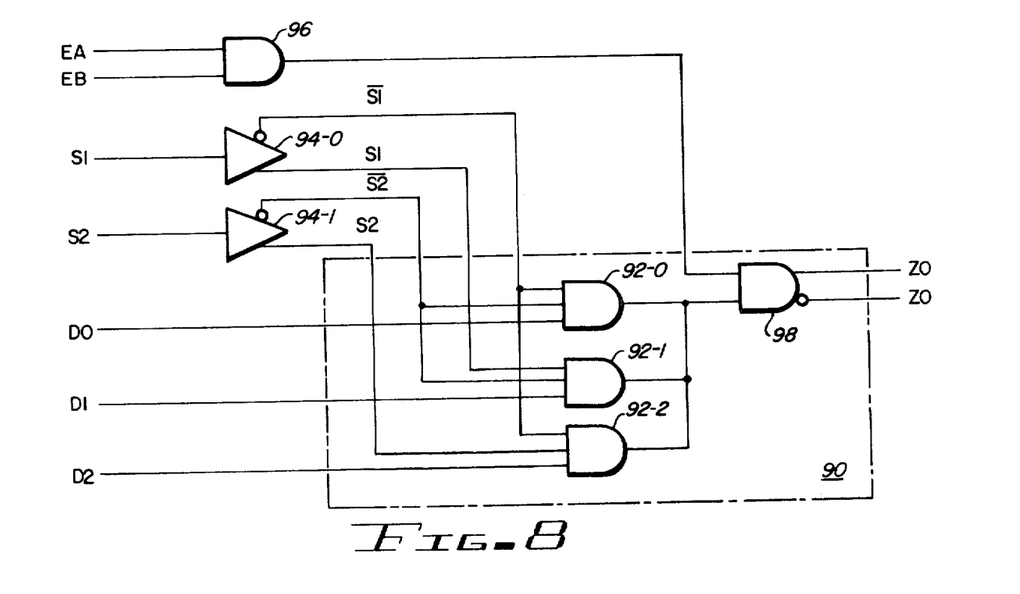
FIG. 8 is a schematic block diagram of a switching unit of a format switch.

FIG. 8 is a block diagram of a 1 or 3 gated select switching unit 90 of format switch 34 that selects which one of the three logic signals applied to the input terminals D 0-2 will be connected to and appear at switching unit 90's output terminal ZO. Terminal ZO is then connected to one conductor of the switch output bus ZFS 38, the most significant bit position, bit position 0, for example. Since a machine word in the preferred embodiment has 36 bits, switch 34 will consist of at least 36 switching units 90. Each unit 90 is provided with three 3-input And gates 92 0-2. Which one of And gates 92 0-2 will be enabled, is determined by gate select control signals S1, S2 which are applied, respectively, to conventional amplifiers 94 0-1. Amplifiers 94 0-1 produce as their output control signals S1, S2 and $\overline{S1}$ and $\overline{S2}$. Control signals S1, S2 and their complements $\overline{S1}$, $\overline{S2}$ are applied to two of the input terminals of each of And gates 92 0-2 so that only one of the gates 92 0-2 can be selected or enabled at any one time. Which one of And gates 92 0-2 is enabled is determined by the binary values of S1 and S2 at any given moment of time. The other input terminals of And gates 92 0-2 is connected respectively to one of the input terminals D 0-2 to which input terminals are applied logic signals or bits on bus ZGR 36 or signals from the power supply such as ground where ground is defined as being a logical 0. In addition to the gate select signals S1, S2 applied to the amplifier circuits 94 0-1; enable logic signals EA and EB are applied to enable And gate 96. The output signal of And gate 96 is applied to an input terminal of output And gate 98. Gates 96 and 98 are in the preferred embodiment two input terminal And gates. Output gate 98 will produce at its output terminal signal ZO and its complement $\overline{ZO}$ which is available if needed. Depending upon the values of S1 and S2 and if the enable signal EA and EB are present, then the signal applied to the selected one of input terminals D 0-2 of unit 90 will be present or appear at output terminal ZO and thus in bit position 0, the most significant bit position, of the format switch output word on format switch output bus ZFS 36. Based on the foregoing description and the illustrations provided, it is believed well within the capability of those skilled in the art to connect the input terminals D 0-2 of the switching unit 90 to the appropriate conductors on the bus ZRG 36 to produce the formats of words on output bus ZFS 36 for each of the three conditions of switch 34 illustrated in FIG. 4.

From the foregoing it is believed obvious that this invention provides hardware for implementing an instruction that will quickly and reliably move a binary number of from one to four characters where a character can have either 8 or 9 bits and which binary number is stred in an addressable register of the processor with the bits and characters of the binary number being right justified against a word or half word boundary to a designated memory location in which the byte containing the most significant character occupies a byte position in the data word to be written into memory at said designated location designated by the instruction. The remaining bytes containing characters of that binary number are placed in order of decreasing significance from left to right beginning with the byte containing the most significant character even if the bytes containing less significant characters of the binary number overflow a word boundary. If such an overflow occurs, a second word is written into memory in an adjacent memory position so that all of the characters of the binary number can be stored contiguously in memory.

While the principles of the invention have now been made clear in an illustrated preferred embodiment, there will be many obvious modifications of the circuits which can be made without departing from the principle. The appending claims are intended to convey such modifications.

What is claimed is:
1. In combination:
   a plurality of addressable registers, each register having a register boundary and each register adapted to have stored in it a binary number divisible into a number of characters with the number of characters being within a predetermined range, and with each character of any given binary number having a predetermined number of bits; said binary numbers being stored in said registers with the bits of each binary number being right justified against a register boundary;
   format switch means having a boundary connected to the addressable registers to which format switch means is applied bits stored in a designated one of said registers for unpacking the characters of the binary number if the number of bits per character is less than the number of bits in a byte, where a byte equals the number of bits in a character or that number plus one, to produce a format switch output word, the bytes of the format switch output word containing characters of the binary number being right justified against a boundary corresponding to the boundary of the addressable register in which the binary number was stored;

shifter means for receivng said format switch output word, and having a shifter output bus operatively connected to the format switch for shifting bytes containing characters of the binary number in the format switch output word and for producing a shifter output word in which the byte containing the most significant character occupies a predetermined byte position in the shifter output word and with other bytes containing characters of the number arranged in order;

shifter output switch means connected to the shifter output bus; and data out register means operatively connected to the shifter output switch means for storing words applied to the data out register means by the shifter output switch means, said shifter output switch means applying a first word to the data out register means containing bits of the byte position containing the most significant character of the binary number with bytes containing less significant characters of the binary number being placed in order of decreasing significance from left to right, and subsequently for applying to the register means a second word containing bytes with characters of lesser significance than those in the first word, with the bytes containing characters of the binary number in the second word being left justified against a word boundary of the register.

2. In the combination of claim 1, in which the range of the number of characters is from 1 to 4.

3. In the combination of claim 2 in which the number of bits in a word is 36.

4. In the combination of claim 3 in which the register boundary is a full word boundary.

5. In the combination of claim 3 in which the register boundary is a half word boundary.

6. In the combination of claim 2 in which the number of bits in a byte is 9.

7. In combination:

an addressable register having a boundary;

a binary number stored in the register, the binary number having p characters of q or q−1 bits per character with the characters of the binary number being right justified against the right boundary and with the characters of the binary number positioned in order of increasing significance from right to left with one of the characters, the one containing the most significant bit of the binary number, being the most significant character;

circuit means having at least a pair of boundaries to which circuit means the binary number stored in the addressable register is applied for reformatting the binary number as stored in the addressable register to place the characters of the binary number into a first output word having r byte positions with their being q bit positions per byte position and with the characters of the binary number stored in the addressable register each being right justified in the byte position into which it is stored, with the least significant character of the binary number in the least significant byte position of the word and with the remaining byte positions of the word having characters positioned in them in order of increasing significance from right to left, the byte positions containing characters being right justified against a boundary of the circuit means in the same manner and order in which the characters were stored in the addressabkle register;

a second register;

means for shifting the first output word so that the most significant character of the binary number occupies a predetermined byte position, and for producing a second output word and including means for storing as a third output word in said second register, the bits of the byte position of said second output word containing the most significant character of the binary number and the bits of any other byte positions of said second output word containing characters of less significance in order from left to right with respect to the most significant character and within the boundaries of the third output word and including means for subsequently loading into the second register as a fourth output word the bits of any byte positions of said second output word containing characters of the binary number which overflowed a word boundary of said third output word with the bits of the most significant byte position overflowing the boundary being left justified against the left boundary of said fourth output word.

8. In the combination of claim 7 in which p is in the range of from 1 to 4.

9. In the combination of claim 8 in which q is 9.

10. In the combination of claim 9 in which r is 4.

11. In the combination of claim 10 in which the boundary of an addressable register is a half word boundary.

12. In the combination of claim 10 in which the boundary of an addressable register is a full word boundary.

13. Computer apparatus comprising:

a group of addressable registers each register having a boundary and the capability of storing up to n bits organized into p byte locations of q bit locations per byte location, said, registers adapted to store a binary number of up to p characters with each character having up to q bits per character, the characters of a binary number being right justified against a boundary when stored in an addressable register;

format switch means having a format switch output bus of n conductors, and having r conditions, said format switch means producing a format switch output word on the format switch output bus, the format of the format switch output word having a predetermined relationship to the format of the bits applied to the format switch means being determined by the condition of the format switch means;

circuit means for applying the bits of a binary number stored in a designated one of the addressable registers to the format switch means;

intermediate register means for storing the bits of the format switch output word on the format switch output bus;

a data out word register having word boundaries;

circuit means to which the bits of the format switch output word stored in the intermediate register are are applied, said circuit means further including means for producing a first data out word and storing it in said data out word register, said first data out word containing the bits of the most significant character of the binary number in a predetermined byte position of the first data out word, the other byte positions of the first data out word containing bits of characters of the binary number arranged in order of decreasing significance within the word boundaries of said first data out word, said circuit means further including means for producing a second data out word and storing the second data out word in the data out register if byte positions containing signals of characters of the binary number of less significance than those stored in the first data out word were present in the format switch output word, said second data out word containing characters of the binary number of such lesser significance in byte positions which are left justified to a word boundary.

14. Computer apparatus as defined in claim 13 in which n=36, p=4 and 1=9.

15. Computer apparatus as defined in claim 14 in which the boundary is a full word boundary.

16. Computer apparatus as defined in claim 15 in which r=3.

17. Computer apparatus comprising:
a controller for producing control signals;
a group of addressable registers operatively connected to the controller each of said registers having a boundary said registers having the capability of storing up to n bits organized into p byte locations of q bit locations per byte location, said registers adapted to store a binary number of up to p characters with each character having up to q bits per character, the characters of a binary number being right justified against a boundary when stored in a register;
format switch means operatively connected to the controller, said format switch means having a format switch output bus of n conductors, and having r conditions, said format switch means producing a format switch output word on the format switch output bus for each of said r conditions, the format of the bits of the format switch output word on the format switch output bus having a predetermined relationship to the format of the bits applied to the format switch means as a function of the condition of the format switch means, the condition of the format switch means being determined by control signals from the controller;
first circuit means operatively connected to the controller and having a boundary, said circuit means in response to control signals from the controller for applying the bits of a binary number stored in one of the addressable registers designated by control signals from the controller to the format switch means, said format switch means being placed in one of its r conditions by control signals from the controller so that the bits of the characters of the binary number applied to the format switch means are present on the format switch output bus with the bits of only one character of the binary number being present on the conductors of each byte position and with the byte positions containing characters of the number being right justified to a boundary of the circuit means;
intermediate register means operatively connected to the controller and to the format switch output bus, and responsive to control signals from the controller for storing the bits of the format switch output word on the format switch output word on the format switch output bus;
a data out register having word boundaries operatively connected to the controller;
second circuit means operatively connected to the controller to the intermediate register and the data out register to which the bits of the format switch output word stored in the intermediate register are applied, said second circuit means responsive to control signals from the controller producing a first data out word containing the bits of the most significant character of the binary number in a predetermined byte position of the first data out word with other byte positions of the data out word containing characters of the binary number arranged in order of decreasing significance from left to right and storing said first data out word in the data out register, said second circuit means further including means for producing a second data out word and storing the second data out word in the data out register if byte positions containing signals of characters of the binary number of less significance than those stored in the first data out word are present in the format switch output word and for positioning the signals of characters of such lesser significance in byte positions in the second data out word with the byte positions containing characters of the binary number being left justified to a word boundary.

18. Computer apparatus as defined in claim 17 in which n=36, p=4, and q=9.

19. Computer apparatus as defined in claim 18 in which r=3.

20. Computer apparatus as defined in clam 19 in which the boundary of an addressable register is a word boundary and a half word equals 36 bits.

21. Computer apparatus as defined in claim 19 in which the boundary of an addressable register is a half word boundary and a half word equals 16 bits.

* * * * *